(12) United States Patent
Whikehart et al.

(10) Patent No.: US 6,470,186 B1
(45) Date of Patent: Oct. 22, 2002

(54) ANTENNA BEAM STEERING RESPONSIVE TO RECEIVER AND BROADCAST TOWER COORDINATES

(75) Inventors: J. William Whikehart, Novi, MI (US); Darby Edward Hadley, Novi, MI (US); John Elliott Whitecar, Plymouth, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/506,294

(22) Filed: Feb. 17, 2000

(51) Int. Cl.[7] ............... H04Q 7/20; H01Q 1/32
(52) U.S. Cl. ............. 455/456; 455/277.1; 343/713; 342/450; 342/357.01
(58) Field of Search ............... 455/456, 457, 455/440, 441, 13.3, 562, 273, 276.1, 277.1, 277.2, 137; 342/140, 357.09, 359, 398, 449, 75, 357.01–357.17, 450; 701/301; 343/711–713, 767; 364/444–460

(56) References Cited

U.S. PATENT DOCUMENTS

| | | |
|---|---|---|
| 4,217,587 A | 8/1980 | Jacomini |
| 4,850,037 A | 7/1989 | Bochmann |
| 4,929,791 A | 5/1990 | Bochmann et al. |
| 5,268,968 A | 12/1993 | Yoshida |
| 5,488,559 A * | 1/1996 | Seymour ............... 364/449 |
| 5,778,324 A | 7/1998 | Smith |
| 6,016,120 A * | 1/2000 | McNabb et al. ....... 342/357.06 |
| 6,061,561 A * | 5/2000 | Alanara et al. ............ 455/422 |
| 6,167,276 A * | 12/2000 | Pite ............................ 455/456 |
| 6,188,356 B1 * | 2/2001 | Kitayoshi ................... 342/451 |
| 6,271,798 B1 * | 8/2001 | Endo et al. ................. 343/713 |
| 6,339,707 B1 * | 1/2002 | Wainfan et al. ............ 455/427 |

FOREIGN PATENT DOCUMENTS

| | | | |
|---|---|---|---|
| EP | 0661522 A * | 7/1995 | ........... G01C/21/20 |

* cited by examiner

*Primary Examiner*—Nguyen T. Vo
*Assistant Examiner*—Duc Nguyen
(74) *Attorney, Agent, or Firm*—John E. Kajander

(57) ABSTRACT

A method of controlling an antenna signal combiner in a vehicle having a navigational system, a broadcast receiver, and multiple antenna elements. The method comprises the steps of the broadcast receiver receiving broadcast signals from a broadcast tower. Then, determine first position coordinates of the vehicle using the navigation system. Next, determine second position coordinates of the broadcast tower and then combining signals from the multiple antennas to steer an antenna beam from the first position coordinates towards the second position coordinates. This method allows for accurate and timely tracking of a broadcast signal.

4 Claims, 5 Drawing Sheets

| TABLE ADDRESS | COEFFICIENTS | | | | STEER TO (A1) |
|---|---|---|---|---|---|
| 0 | a1,1 p1, 1 | a2, 1 p2, 1 | a3,1 p3, 1 | a4,1 p4, 1 | 0 DEGRESS |
| 1 | a1, 2 p1, 2 | a2, 2 p2, 2 | a3, 2 p3, 2 | a4, 2 p4, 2 | 10 DEGRESS |
| 2 | a1,3 p1, 3 | a2, 3 p2, 3 | a3, 3 p3, 3 | a4, 3 p4, 3 | 20 DEGRESS |
| 3 | a1,4 p1, 4 | a2, 4 p2, 4 | a3, 4 p3, 4 | a4, 4 p4, 4 | 30 DEGRESS |
| 4 | a1,5 p1, 5 | a2, 5 p2, 5 | a3, 5 p3, 5 | a4, 5 p4, 5 | 40 DEGRESS |
| 5 | a1,6 p1, 6 | a2, 6 p2, 6 | a3, 6 p3, 6 | a4, 6 p4, 6 | 50 DEGRESS |
| 6 | a1,7 p1, 7 | a2, 7 p2, 7 | a3, 7 p3, 7 | a4, 7 p4, 7 | 60 DEGRESS |
| 7 | a1,8 p1, 8 | a2, 8 p2, 8 | a3, 8 p3, 8 | a4, 8 p4, 8 | 70 DEGRESS |
| * | * | * | * | * | * |
| * | * | * | * | * | * |
| * | * | * | * | * | * |
| * | * | * | * | * | * |

ANTENNA BEAM STEERING RESPONSIVE TO RECEIVER AND BROADCAST TOWER COORDINATES

BACKGROUND OF THE INVENTION

The present invention relates in general to a method and apparatus for controlling an antenna signal combiner in a vehicle to steer an antenna beam toward a broadcast tower.

A primary source of noise and distortion in radio receivers is from multipath interference. This is a localized effect resulting from interaction between separate signals from a transmitter which traverse different paths (e.g., via reflections) to reach a receiving antenna. Because of the superposition of several signals (i.e., echoes and/or direct waves), the signal strength of the received signal changes drastically and may fall below the noise floor. Based upon the differences in path lengths of each received wave, the multipath distortion or fading may include short time delayed multipath interference and/or long-time delayed multipath interference signals. The multipath interference depends upon diverse geographic features and buildings. In an urban area with high buildings along both sides of a street, for example, the broadcast waves propagate along the street and become mixed with many short-time delayed signals. Along a riverside, long-time delayed signals may be mixed with both direct and quasi-direct signals. In a basin, there may be several long-time delayed signals arriving from different directions. This variability has made it difficult to solve the problem of multipath distortion in mobile radio receivers.

A well known means for reducing multipath distortion is through use of space-diversity antennas in a radio receiver system. By switching between antenna signals from spaced apart antennas, specific multipath events can be avoided if the antenna spacing is enough to insure that both antennas will not experience the same multipath event at the same time. However, since space diversity radio receiver systems cannot select only a single wave, they cannot completely avoid multipath distortion. The distortion is especially serious in long-time delay multipath conditions, such as may exist at a riverside or in a basin.

Another technique that has been used to reduce multipath interference is known as antenna beam steering. These systems use an antenna array which is operated in a manner to receive broadcast waves from substantially a single direction only.

In the past, beam steering systems have not had any way of accounting for vehicle changes in orientation or direction and were limited to periodic sampling of signals from various directions to find the beam steering direction which gives the best reception. As the vehicle changes direction, beam steering systems will loose best reception momentarily as the system restores the beam direction to account for the vehicle change in direction.

SUMMARY OF INVENTION

The present invention has the advantage of providing a mobile receiver with greatly reduced multipath distortion, better and faster tracking of a broadcast signal, and less complexity while maintaining reasonable gain for the desired signal.

In one aspect of the invention, a method is provided for controlling an antenna signal combiner in a vehicle having a navigational system, a broadcast receiver, and multiple antenna elements. The method includes receiving broadcast signals from a broadcast tower. First position coordinates of the vehicle are determined using the navigation system. Second position coordinates of the broadcast tower are determined. Signals from the multiple antennas are combined to steer an antenna beam from the first position coordinates toward the second position coordinates.

DETAILED DESCRIPTION OF PREFERRED EMBODIMENT

Figure 1:
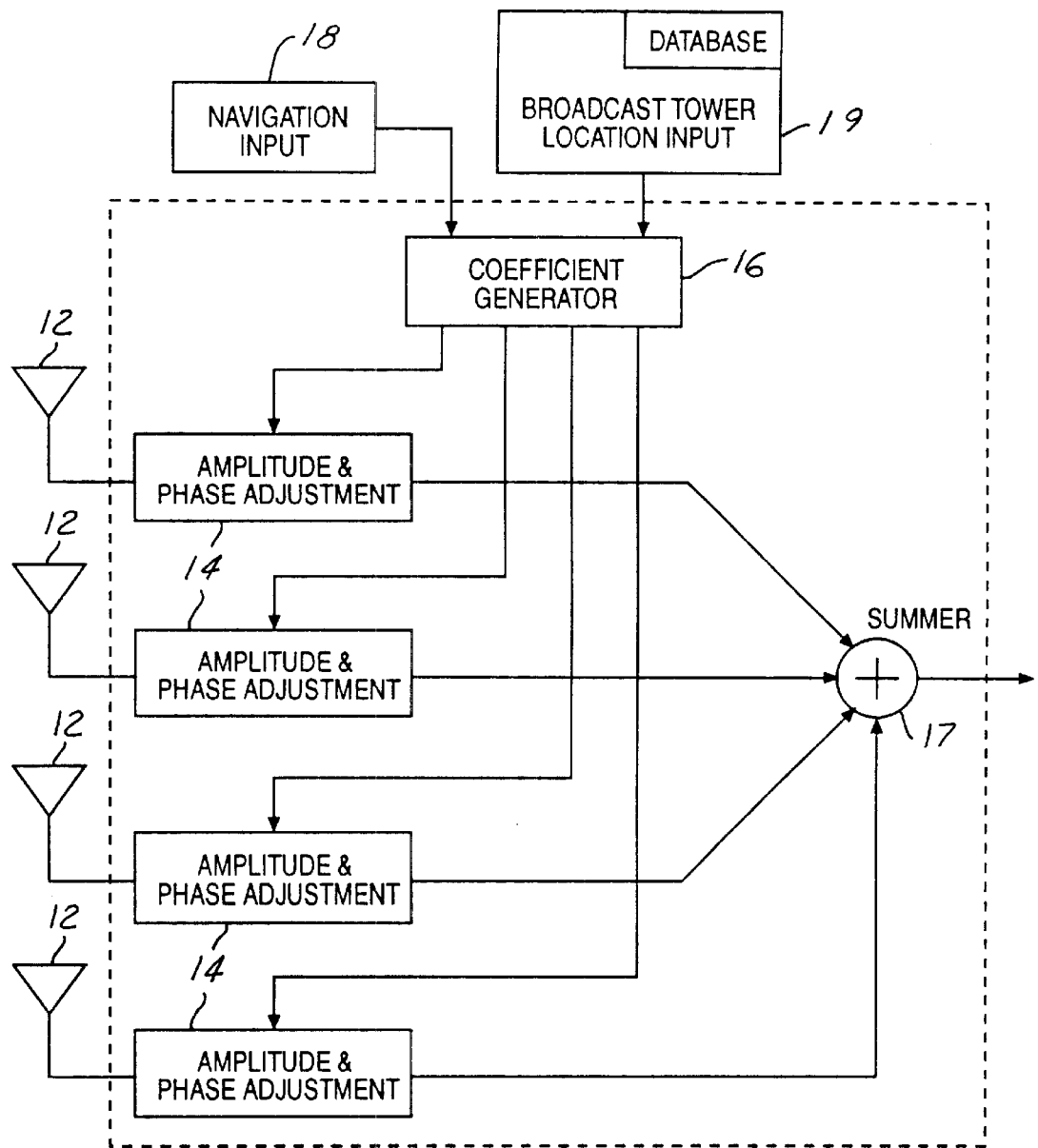
FIG. 1 is a block diagram depicting an antenna combiner which utilizes the present invention.
Figure 2A:
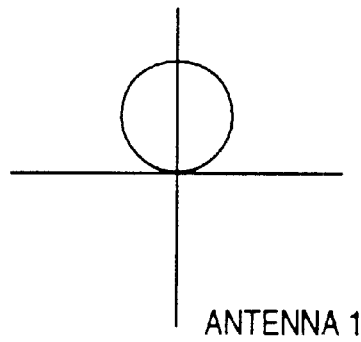
FIGS. 2a to 2e are antenna gain plots depicting the combination of four antenna patterns into a resultant antenna pattern.
Figure 2B:
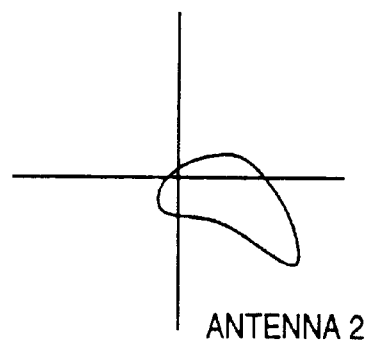
Figure 2C:
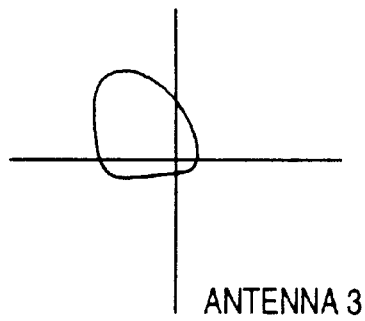
Figure 2D:
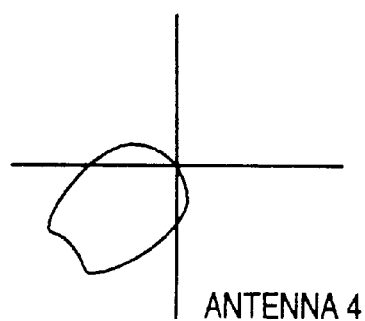
Figure 2E:
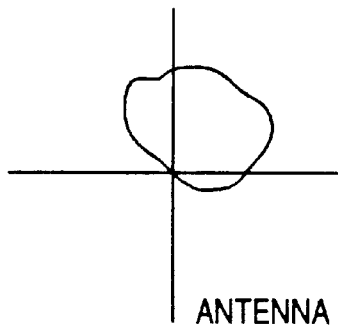

FIG. 1 shows an antenna combiner 10 which utilizes navigational data and broadcast tower position data to greatly reduce multipath distortion while maintaining reasonable gain of a desired signal. A plurality of antenna elements 12 coupled to a broadcast receiver, a navigation input 18, and a broadcast tower location input 19 are coupled to an antenna combiner 10 which combines received broadcast signals into a single resultant antenna signal. Antenna combiner 10 comprises a plurality of amplitude and phase adjuster circuits 14, a coefficient generator 16, and a summer 17. Coefficient generator 16 generates beam steering coefficients which are transferred to amplitude and phase adjuster circuits 14 for any predetermined beam steering angle. In a mathematical sense, the beam steering coefficients are a set of complex numbers which multiply the received broadcast signals. Any well known beam steering equation can be used to combine the received broadcast signals.

Navigation input 18 and broadcast tower location input 19 are coupled to coefficient generator 16 wherein coefficient generator 16 selects appropriate coefficients to provide an antenna beam steering angle oriented toward a broadcast tower location.

Summer 17 sums the complex numbers, which represent the broadcast signals, from amplitude and phase adjuster circuits 14 into a resultant antenna signal. The resultant antenna signal has a corresponding antenna beam which is based on the summing of the incoming signals as seen in FIG. 2. This resultant antenna beam is steered to insure that the resultant signal is directed towards the broadcast tower location.

Navigation input 18 is derived from a vehicle navigational system or other vehicle localizer. The navigational system/ vehicle localizer detects the vehicle's position and heading, referred to as first position coordinates. As the vehicle's position and direction changes, a signal containing a new position/heading is sent to the antenna combiner where it is received by coefficient generator 16. The navigational system/vehicle localizer can be a GPS receiver or can utilize a tire rotation monitor and/or a vehicle turn indicator with map matching to generate a vehicle location and heading in a conventional manner. The GPS receiver utilizes satellite reference signals to determine a vehicle location and heading.

Amplitude and phase adjuster circuits 14, coefficient generator 16, and summer 17 can be software routines within an embedded processor of any type commonly used in automotive applications for digital signal processing.

Broadcast tower location input 19, referred to as second position coordinates, is preferably derived from a broadcast tower localizer which comprises a database which has positions of predetermined broadcast towers. The broadcast tower localizer can reside within the broadcast receiver or be a separate unit. The database can be updated by an operator manually through an interface or by a software download of the broadcast tower positions. The broadcast tower localizer can also permit broadcast tower location 19 to be manually inputted through an operator interface if the location is not already available in the database.

Figure 6:
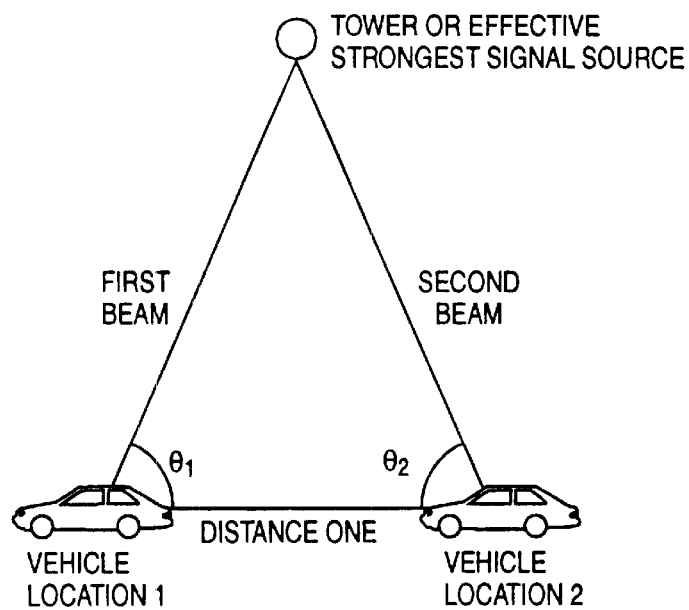
FIG. 6 is a diagram depicting triangulation.

Another way to compile broadcast tower locations for the database is to use triangulation during vehicle travel if the radio receiver has the capability of the prior art to steer the antenna beam in response to received signal strength. Triangulation, as seen in FIG. 6, comprises using the position of the vehicle and an antenna beam steering angle at two different locations while receiving from the same broadcast tower to estimate the tower location. At a first vehicle position, a first steering angle ($\theta_1$) has a first beam direction derived from the steering of a beam utilizing a conventional beam steering system. At a second vehicle position, a second steering angle ($\theta_2$) has a second beam direction derived from the steering of a beam utilizing a conventional beam steering system. The distance between the first vehicle position and the second vehicle position (distance one) makes up a first side of a triangle. The first and second beam directions define a second side and a third side of the triangle respectively. Using trigonometric principles, the position of the broadcast tower can be calculated. The broadcast tower position can then be stored in a table or in a memory location for later use either alone or in conjunction with conventional beam steering.

The position of the broadcast tower can also be obtained by having the broadcast tower transmit its position coordinates directly to the vehicle. These second position coordinates can be encoded within a subcarrier of the broadcast signal and decoded by the vehicle when received.

Figures 3A, 3B:
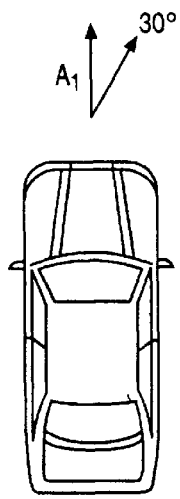
FIG. 3 is a depiction of coefficients found in a table based on a steering angle.
Figure 4:
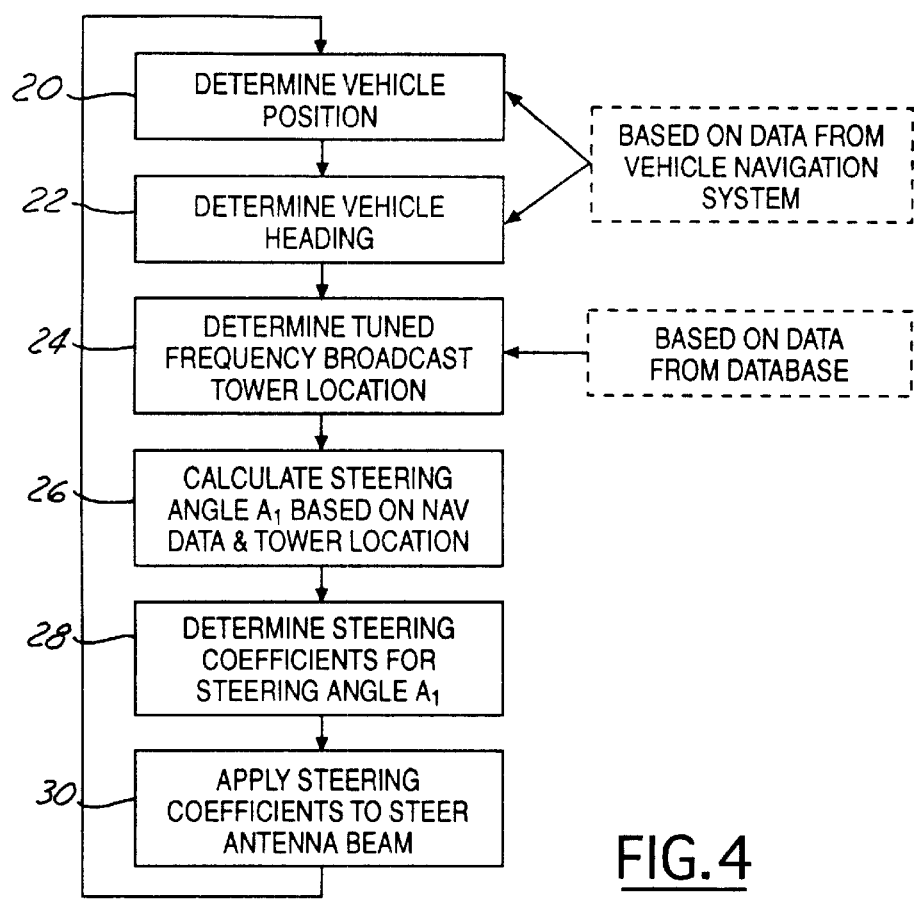
FIG. 4 is a flowchart of a preferred embodiment of the invention.

A preferred method of controlling an antenna signal combiner in a vehicle having multiple antennas will be described in connection with the flowchart of FIG. 4. While receiving broadcast signals, the vehicle position and heading (first position coordinates), are determined by the navigation system in steps 20 and 22. Next, the position of the broadcast tower (second position coordinates) is determined by the broadcast tower localizer in step 24. An antenna steering angle ($A_1$), is calculated by an antenna steering angle generator based upon the position of the tower, the position of the vehicle, and the heading of the vehicle in step 26. After the steering angle is calculated, steering coefficients are determined by the coefficient generator based on the steering angle ($A_1$) in step 28. The steering coefficients are selected from a table which contains a steering angle with corresponding coefficients. For example, if the steering angle is equal to 20 degrees then a table address pointer will be pointing at a table address of 2. Corresponding coefficients will be chosen accordingly. If the vehicle's location or heading changes such that the new steering angle is 30 degrees, corresponding coefficients which represent a steering angle 30 degrees are selected as seen in FIG. 3. If the table address pointer is initially located at table address 2, the turn will cause the table address pointer to be adjusted to table address 3 and appropriate coefficients will be chosen. The coefficients within the table are generated by means well known in the art. The steering coefficients are then applied to the amplitude and phase adjuster circuits to steer the antenna beam towards the broadcast tower in step 30.

Figure 5:
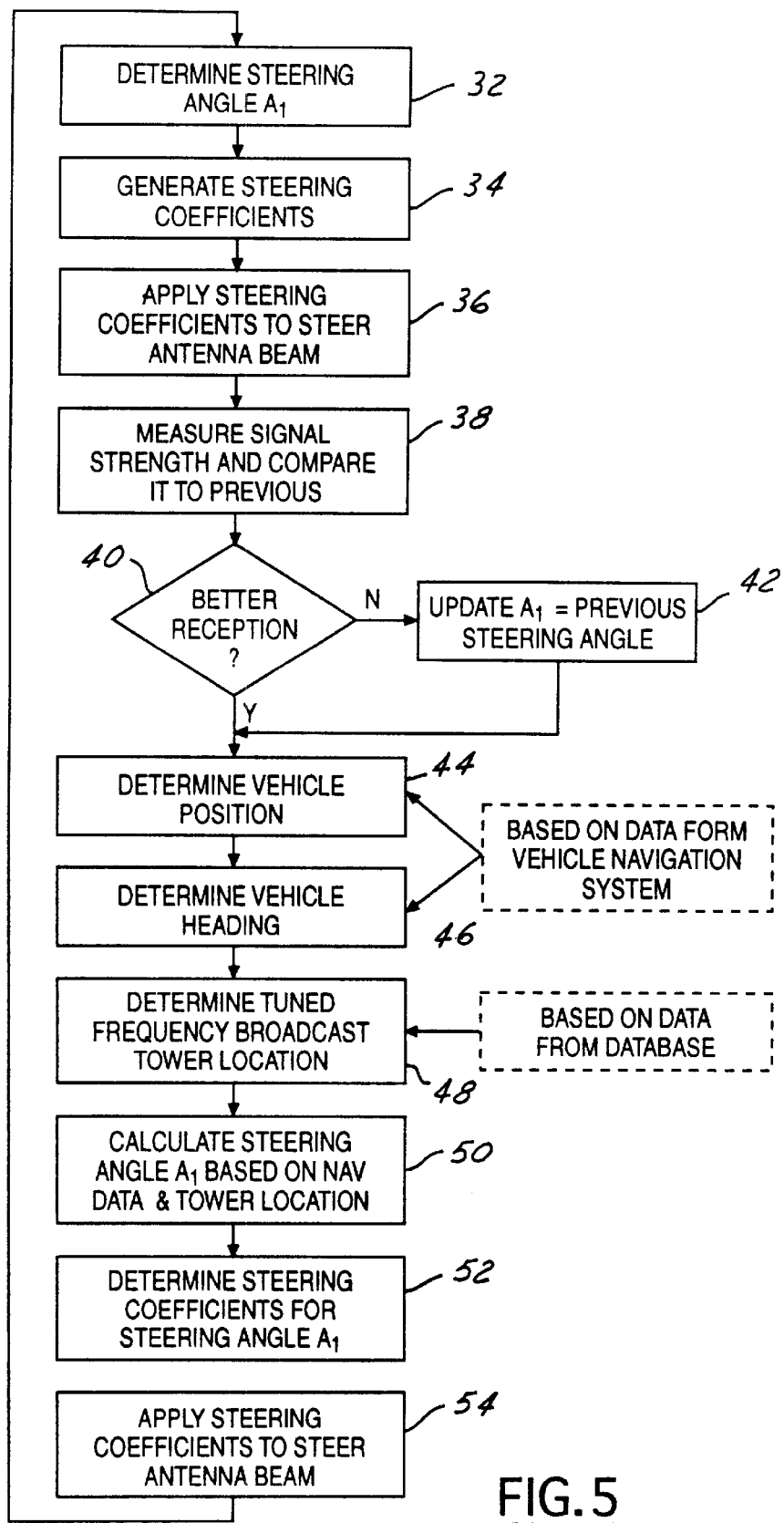
FIG. 5 is a flowchart of an alternative embodiment of the invention.

Referring to FIG. 5, an alternative embodiment is shown. While receiving broadcast signals, a steering angle ($A_1$) is calculated using a conventional beam steering technique in step 32. Steering coefficients are then generated in response to the steering angle in step 34. The steering coefficients are then applied to steer an antenna beam in step 36. A signal strength is measured in step 38 and compared to a previous measured signal. If better reception is not acquired in step 40 then the steering angle ($A_1$) is updated to equal a previous steering angle and corresponding coefficients are applied to steer the antenna beam. If better reception is acquired, the vehicle position and heading (first position coordinates) are determined by the navigation system in steps 44 and 46. Next, the position of the broadcast tower (second position coordinates) is determined by the broadcast tower localizer in step 48. An antenna steering angle ($A_1$), is calculated by an antenna steering angle generator based upon the position of the tower, the position of the vehicle, and the heading of the vehicle in step 50. After the steering angle is calculated, steering coefficients are determined by the coefficient generator based on the steering angle ($A_1$) in step 52. The steering coefficients are selected from a table which contains a steering angle with corresponding coefficients. For example, if the steering angle is equal to 20 degrees then a table address pointer will be pointing at a table address of 2. Corresponding coefficients will be chosen accordingly. If the vehicle's location or heading changes such that the new steering angle is 30 degrees, corresponding coefficients which represent a steering angle 30 degrees are selected as seen in FIG. 3. If the table address pointer is initially located at table address 2, the turn will cause the table address pointer to be adjusted to table address 3 and appropriate coefficients will be chosen. The coefficients within the table are generated by means well known in the art. The steering coefficients are then applied to the amplitude and phase adjuster circuits to steer the antenna beam towards the broadcast tower in step 54.

What is claimed is:

1. A method of controlling an antenna signal combiner in a vehicle having a navigational system, a broadcast receiver, and multiple antenna elements, said method comprising the steps of:

receiving broadcast signals from a broadcast tower;

adaptively steering an antenna beam in response to said broadcast signals;

determining first position coordinates of said vehicle and a first direction toward which said antenna beam is steered using said navigation system;

moving said vehicle to a second location;

adaptively steering said antenna beam in response to said broadcast signals;

determining second position coordinates of said vehicle and a second direction toward which said antenna beam is steered using said navigation system;

determining third position coordinates of said broadcast tower by triangulating said first position coordinates and said first direction with said second position coordinates and said second direction; and combining signals from said multiple antenna elements to steer an antenna beam from said vehicle towards said third position coordinates.

2. The method according to claim 1 wherein first and second position coordinates are derived from a vehicle localizer comprising a tire rotation monitor and a vehicle turn indicator.

3. The method according to claim 1 wherein said first and second position coordinates are derived from a GPS receiver.

4. The method of claim 1 further comprising the steps of:

storing said third position coordinates in a database according to said broadcast tower.

* * * * *